United States Patent [19]
Olrik

[11] Patent Number: 5,591,310
[45] Date of Patent: Jan. 7, 1997

[54] DISTILLATION

[75] Inventor: Henrik G. Olrik, Humlebæk, Denmark

[73] Assignee: Grundfos International A/S, Bjerringbro, Denmark

[21] Appl. No.: 108,556

[22] PCT Filed: Feb. 21, 1992

[86] PCT No.: PCT/DK92/00051

§ 371 Date: Dec. 8, 1993

§ 102(e) Date: Dec. 8, 1993

[87] PCT Pub. No.: WO92/14531

PCT Pub. Date: Sep. 3, 1992

[30] Foreign Application Priority Data

Feb. 22, 1991 [DK] Denmark .................................. 0310/91

[51] Int. Cl.$^6$ ............................................................. B01D 3/42
[52] U.S. Cl. ....................... 202/160; 159/24.1; 159/27.2;
159/DIG. 40; 202/176; 202/197; 203/2;
203/3; 203/10; 203/24; 203/23; 203/40;
203/DIG. 8; 203/DIG. 17
[58] Field of Search .................................. 202/160, 176,
202/197, 182, 202, 206, 205; 203/1, 2,
3, 10, 40, 24, 23, DIG. 8, DIG. 17, 91;
159/6.1, 24.1, 27.2, DIG. 40, DIG. 16

[56] References Cited

U.S. PATENT DOCUMENTS

| | | |
|---|---|---|
| 1,204,716 | 11/1916 | Thorssell . |
| 2,520,186 | 8/1950 | Von Platen . |
| 3,361,647 | 1/1968 | Brown et al. . |
| 3,444,050 | 5/1969 | Sundquist ..................... 203/1 |
| 3,477,918 | 11/1969 | Jakob . |
| 3,522,152 | 7/1970 | Osdor ........................ 203/173 |
| 3,907,683 | 9/1975 | Gilmont ..................... 202/197 |
| 3,930,960 | 1/1976 | Taylor ..................... 202/185.6 |
| 4,159,227 | 6/1979 | Sundquist ..................... 203/1 |
| 4,575,405 | 3/1986 | Sterlini ........................ 203/26 |
| 4,770,748 | 9/1988 | Cellini et al. .............. 202/185.6 |
| 5,217,581 | 6/1993 | Ewing ..................... 202/206 |

FOREIGN PATENT DOCUMENTS 556686 7/1923 France .

Primary Examiner—Virgina Manoharan
Attorney, Agent, or Firm—Ladas & Parry

[57] ABSTRACT

An apparatus for distillation of a liquid near or above its critical point wherein the liquid contains a dissolved solid. The apparatus includes a separation section wherein the liquid may be separated into a vapor and a liquid residue separated by a liquid surface. The apparatus includes a pump for pumping liquid into the apparatus so as to establish and maintain the liquid and vapor in the separation section at a desired pressure and a heat source for heating the liquid and vapor so as to establish a rising temperature profile in the separation section. The pump and heat source are cooperatively controllable for regulating the position of the liquid surface so that liquid residue can be discharged from immediately below the liquid surface.

12 Claims, 13 Drawing Sheets

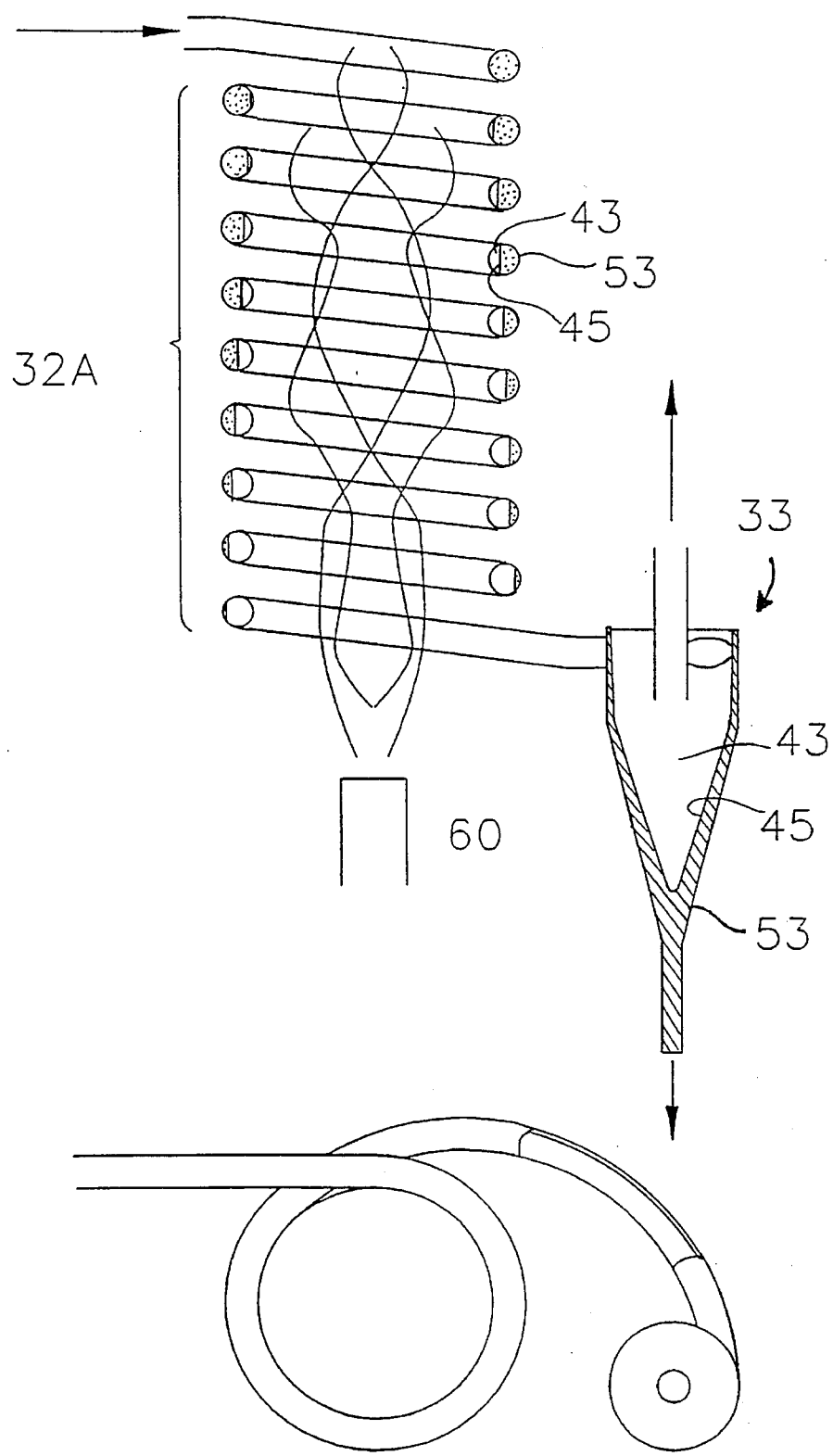

DISTILLATION

BACKGROUND OF THE INVENTION

Technical Field

The present invention concerns a method an apparatus for distillation of a liquid near or above the critical point of the liquid, particularly for use in desalination of salt water or purification of organically tainted waste water from industry and agriculture.

Liquid such as saline drinking water can be purified of solid substances using distillation by retaining the non-volatile substances of the liquid as a residue in the distillation container and allowing the vapor, which evaporates from the liquid, to pass into the condensation part, in which it is condensed as a distillate possibly containing volatile substances and the components of the air dissolved therein.

Evaporation of the vapor from the liquid comprises a phase shift from liquid to vapor, just as the condensation of the vapor from vapor to liquid comprises a phase shift from vapor to liquid, both of which being driven by forces which are caused by differences in pressure, temperature or concentration above a liquid-vapor interface. At pressures and temperatures below the critical point of the liquid, the liquid may be brought from liquid phase to vapor phase at a constant temperature by addition of the necessary evaporation heat. However, at pressures and temperatures above the critical point this phase shift can take place without addition of heat, because the evaporation heat at these super critical pressure and temperature conditions is zero. As a case in point it may be mentioned that the evaporation heat is 2257 kJ for 1 kg of water at 1 atm and 100° C., whereas it is 0 kJ at the critical point at 221,20 bars and 374.15° C. "Distillation below the Critical Point"

To obtain optimum energy utilization in distillation of a liquid below the critical point, it is known to heat the liquid using the energy, including the evaporation heat, available in the vapor.

It is known from e.g. "Principles of Distillation", Part A and B, Editors K. S. Spiegler and A. D. K. Laird, Academic Press Inc., 1980, New York to perform distillation by thermal single—or multi-step evaporation processes, in which the energy available in the discharge currents of distillate and residue contributes to heating the feed stream. For such processes the driving force is provided for the heat transfer by a temperature difference between the discharge streams and the feed stream, which is substantially established by lowering the vapor pressure of the liquid.

It is moreover known, ibid, to perform distillation of a liquid by evaporation processes in which a temperature difference between the discharge streams and the feed stream is established by condensing and cooling the vapor from a compressed state, thereby creating a higher vapor pressure for the liquid.

A common drawback of these evaporation processes is that they all require addition of evaporation heat, and that reuse of the added energy requires difficult and cumbersome multi-step processes or vapor compression processes, the latter requiring compressors which, frequently with low efficiencies, are to be capable of compressing large volumes of vapor at relatively low pressures.

Another drawback is that it is not certain that the distillate is sterile.

Accordingly, there is a need for a liquid distillation technique wherein a lower energy consumption is achieved than by the heretofore known methods, while ensuring that the distillate is sterile.

"Distillation above the Critical Point"

It is known to separate solid, non-volatile substances from a solution in a liquid by evaporating and distilling the liquid at pressures and temperatures exceeding the critical pressure and the critical temperature of the liquid, wherein a lower energy consumption is achieved than by heretofore known techniques, while ensuring that the distillate is sterile, the necessity of recovering the evaporation heat is obviated, and the necessity of compressing vapor or using multi step heat exchanging processes in order to reuse the energy available in the vapor is obviated.

According to the prior art a liquid is distilled near or above the critical point of the liquid by a) feeding the liquid to a heat exchanger in which it is heated, and then b) conveying the heated liquid to a separator to which a pressure is applied so that the liquid is brought to a state near or above the critical point, whereby it undergoes a phase shift forming a vapor phase and a liquid residue which are separated by a liquid surface, and then c) the vapor under phase shift to liquid and the residue are discharged as a distillate and a residue, respectively, such that they release their heat to the liquid in the heat exchanger, thereby heating the liquid.

Specifically it is known to use this technique in connection with crystallization of salt from an achieved saline residue.

A drawback of this prior art is that the distillation is unstable so that overflow of saline residue to the distillate may occur.

Prior Art Patent Literature

U.S. Pat. No. 1204716 describes a method of evaporation and distillation of liquids at pressures and temperatures which correspond to or are near the critical point of the liquid.

U.S. Pat. No. 2520186 discloses a process and apparatus for separating solid, non-volatile substances from a solution in a liquid to be purified wherein the liquid is subjected to a pressure exceeding the critical pressure of the pure solvent; the temperature of the liquid is raised to a point above the critical temperature of pure solvent while maintained under such high pressure thereby forming a vapor phase and a concentrated salt solution; separating the vapor phase from the concentrated salt solution; cooling the separated vapor phase and, if desired, the concentrated salt solution by giving off heat to the solution to be purified while maintained under pressure. The apparatus comprises additional heating means in form of an electric resistance wire wound around the upper portion of the pressure receiver receiving the liquid to be purified for compensation of unavoidable heat loss to the surroundings. Further, the apparatus may comprise filters which filter off any precipitation in the vapor phase when the vapor is let out and subsequently gives off its heat in a heat exchanger.

This process and apparatus provide an inefficient separation of the solid, non-volatile substances resulting in unacceptable high concentrations of solid, non-volatile substances in the distillate, i.e. because these substances tend to be carried over from the concentrated salt solution to the vapor phase.

U.S. Pat. No. 3361647 describes a method and an apparatus for crystallizing salt from a brine by establishing a pressure and a temperature in the brine which are above the critical pressure and the critical temperature of pure water, and which are sufficient to cause phase separation between a salt-lean vapor phase and salt-rich liquid phase, from which a portion is passed on for separation of salt in crystallization chamber.

U.S. Pat. No. 3477918 describes a vapor compression distillation process for recovery of purified water from a solution of water and dissolved substances by vapor compression at 80–200 atm. A drawback of the prior art according to the above-mentioned patent specifications is that they are too unstable and ineffective for use in industrial processes.

DESCRIPTION OF THE INVENTION

Object of the Invention

An object of the present invention is to provide a method and an apparatus for distillation of a liquid near or above the critical point of the liquid which are more efficient and reliable in operation than the heretofore known techniques and which provide distillates of acceptable low concentrations of solids.

Another object of the present invention is to provide such a method and such an apparatus for distillation, particularly for desalination of salt water and for heat-pressure treatment of the water, in particular organically tainted waste water from industry and agriculture, which can be realized in a compact system having small physical dimensions.

Solutions according to the Invention

"Method of Super Critical Distillation"

These objects are achieved according the invention by providing a method of distilling of a liquid near or above the critical point of the liquid, wherein a) the liquid is fed to a heating zone in which it is heated, and then b) the heated liquid is conveyed to a separation zone to which a pressure is applied such that the liquid is brought to a state near or above the critical point, whereby it undergoes a phase shift forming a vapor phase and a liquid residue which are separated by a liquid surface, and then c) the temperature of the vapor in the vapor phase is raised, and d) the vapor phase-shifted from vapor to liquid and the residue are discharged as a distillate and a residue, respectively, such that they release their heat to the liquid in the heating zone, thereby heating the liquid, said method being characterized by providing in a predominant part of the separation zone a temperature profile which increases from a liquid inlet to a vapor outlet, said temperature profile bringing the liquid to the state near or above the critical point forming the liquid surface between the liquid inlet and the vapor outlet, and withdrawing the residue immediately below the liquid surface in the separation zone.

"Apparatus for Super Critical Distillation"

These objects are moreover achieved by providing an apparatus for distillation of liquid near or above the critical point of the liquid, comprising a) a separator, b) a heat exchanger, c) a supply conduit for feeding liquid to the heat exchanger, d) a heat source for heating liquid and vapor in the separator, e) discharge conduits for discharging the vapor and the residue, respectively, from the separator, and f) pumps for pumping-in the liquid and pumping out the vapor and the residue, respectively, said liquid supply conduit and heat source being adapted to establish such a pressure and such a temperature in the separator that the liquid is being brought to a state near or above the critical point forming a vapor phase and a liquid residue which are separated by a liquid surface, and said vapor and residue discharging conduits discharging the vapor and the residue in the separator via the heat exchanger in which the vapor is converted to a distillate, said apparatus being characterized in that heat source is provided in connection with a predominant part of the separation section to establish a rising temperature profile from a liquid inlet to a vapor outlet in the separation section, said temperature profile bringing the liquid to the state near or above the critical point forming the liquid surface, and that the outlet for the residue discharging conduits in the separation section is positioned immediately below the liquid surface between the vapor and the residue.

Effects According to the Invention

By providing in a predominant part of the separation zone a temperature profile which increases from a liquid inlet to a vapor outlet, it is achieved i) that the liquid in the separation zone is heated such that temperatures above the critical temperature exist from an area in the liquid along the increasing temperature profile, in which area the liquid is present in a super critical state and therefore undergoes a phase shift forming, without an increase in volume, a vapor phase which is not capable of carrying solid matter or is just capable of carrying little solid matter, and ii) that a liquid surface is formed between the super critical vapor phase and the liquid, which is sub-critical, said liquid surface separating the solid-lean vapor phase from the solid-rich liquid phase, the residue, the position of said liquid surface depending upon the concentration of dissolved matter in addition to pressure and temperature.

Furthermore, by withdrawing the residue immediately below the liquid surface in the separation zone it is achieved iii) that the liquid surface does not move, thereby ensuring that the distillation can be performed in a stable manner without residue being entrained in the distillate.

This effect can be illustrated by the following non-limiting explanation as an increase of the critical point of the residue which is analogous with the boiling point increase of e.g. salt solutions.

If it is imagined that the outlet of the residue is positioned too far down in the liquid below the liquid surface, this entails that a sufficient amount of solid is not discharged with the residue to keep the solid concentration below the liquid surface at its equilibrium concentration at the pressure and temperature concerned. The solid concentration would be too high for the available liquid to be able to carry the additional solid. To reduce the solid concentration to its equilibrium concentration the liquid therefore does not release so much vapor to the vapor phase, which results in a rising liquid surface.

It has thus been found by tests that when the residue outlet is positioned too far down in the liquid below the liquid surface, the liquid surface can rise so much that the residue flows out through the distillate pipe.

Conversely, when the residue outlet is positioned too high in the vapor phase with respect to the liquid surface, this rises until this is just above the pipe.

Thus, according to the invention it is ensured that the separation of the distillate and residue is stable without overflow of residue into the distillate, thereby ensuring a reliable function in operation. Moreover, when the residue is withdrawn in accordance with the invention, the residue is discharged with the greatest possible concentration of solid, thereby providing an efficient distillation process.

Further, with the temperature profile present in the vapor phase, it is ensured that vapor at higher temperatures carries less and less solid whereby acceptable low concentrations of solid in the vapor leaving the separation zone and consequently in the distillate are obtained.

Preferred Embodiments of the Method

To achieve additional advantages it is preferred that the distillation process according to the invention is performed according to the following preferred embodiments.

In a preferred embodiment of the method the temperature of the vapor in the vapor phase is raised by adding heat in an area of the separation zone which is situated at a relatively great distance from the area of the separation zone in which the residue is withdrawn, thereby ensuring that the liquid surface is above the residue outlet and not completely or partly in the vapor phase.

In another preferred embodiment the temperature of the vapor in the vapor phase is raised by either heating the vapor by addition of heat to it within the separation zone, heating the vapor by addition of heat to it outside and into the separation zone, or withdrawing the vapor from the separation zone and heating the withdrawn vapor, thereby ensuring that the heat consumed by the distillation is just to be added at one location, that is, the location where the vapor in the vapor phase is heated, and that the heat here is added through the vapor such that liquid drops are not carried over in the vapor phase. It is moreover ensured that possible liquid drops with a great content of solid are dried, so that these are forced to fall back on the liquid surface because of gravitation or a centrifugal force.

In yet another preferred embodiment the last part of the separation zone is a cyclone zone in which the liquid surface assumes a parabolic-like shape, thereby making it possible to provide a great centrifugal force enabling a compact system with small physical dimensions to be realized.

In yet another preferred embodiment the last part of the separation zone is a separatory funnel zone.

In a preferred embodiment, particularly in the embodiment in which the last of the separation zone is a cyclone zone or a separatory funnel zone, the temperature of the vapor in the vapor phase is raised by heating the vapor by addition of heat to it inside a helical course of the predominant part of the separation zone, whereby the formed vapor, possible drops and the liquid are acted upon by a centrifugal force which separates the vapor and the liquid from each other and ensures that residue-containing drops, if any, are preferably forced into the liquid phase, In a preferred embodiment the liquid is fed in the bottom of the separation zone, thereby making it possible to realize a simple method utilizing gravitation to separate the vapor phase and the residue phase.

For a great part of the added thermal energy to be reused, in particular for heating the added liquid, the distillate and the residue, respectively, are preferably discharged such that they release their heat to the liquid in the heating zone, individually or both at the same time.

The heat from the vapor and the residue may optionally be used for other purposes than heating the liquid, e.g. in connection with heating in other process steps, where this is expedient.

Preferred Embodiment of the Apparatus

In a preferred embodiment the apparatus comprises reciprocating pumps with displacement means, such as pistons or diaphragms for liquid, residue and distillate, respectively, which are characterized in that each of the pumping-out cylinders associated with the residue displacement means and the distillate displacement means communicates with an outlet valve and a slide valve, which are controlled by the piston movement such that the slide valve shuts off discharge of liquid to a discharge outlet when the piston has reached a position before its top position, and opens the outlet valve when the pressures above it are comparable, thereby achieving that pressure surges in the system are prevented, the outlet valve is relieved of great pressure differences, and that the valve has a long life, because cavitation corrosion is thereby prevented.

In a preferred embodiment the control of the piston movement is additionally such that the slide valve shuts off admission of liquid from the outlet valve when the piston has reached a position before its bottom position and allows discharge of liquid to the discharge outlet when the pressures above it are comparable, which likewise imparts a long life to the valve, because cavitation corrosion is thereby prevented.

In a preferred embodiment, the pumping-in cylinder associated with the liquid displacement means communicates with an exhaust valve to which a relief valve is coupled, said relief valve being set to open when the pressure in the system exceeds a desired pressure, thereby ensuring that the same amount is always pumped in as is pumped out, irrespective of dissolved gasses and differences in coefficients of expansion, that the pressure is kept constant, such that the system is not subjected to e.g. harmful pressures, and the energy is not lost at a greater pumping-in stroke volume.

In a preferred embodiment a heat source feeds heat to the separation section inside it, outside and into it, or the vapor discharge conduits include a section outside the separation section which is heated by a heat source.

In a preferred embodiment the last part of the separation section is a cyclone or a separatory funnel.

In a preferred embodiment, in particular the one in which the last part of the separation section is a cyclone or a separatory funnel, a heat source for addition of heat to the separation section is positioned radially within a helical course of the predominant part of the separation section, thereby insuring that both the formed vapor possible drops and the liquid are affected by a centrifugal force which separates the vapor and the liquid from each other and insuring that residue-containing drops, if any, are preferably forced into the liquid phase.

In a preferred embodiment the liquid feeding means feeds the liquid in the bottom of the separation section.

Definition of Expressions

The expression "distillation" as used herein means a combination of first a phase shift from liquid to vapor and then a subsequent phase shift from vapor to liquid, in which a liquid comprising a solution of substances can be separated in one or more fractions.

The expression "solid" as used herein means insoluble as well as soluble substances, such as insoluble and soluble organic and inorganic substances which are retained in the residue at the given conditions of distillation.

BRIEF DESCRIPTION OF DRAWINGS

The invention will be explained more fully below with reference to the drawings, in which

FIG. 14A shows a preferred embodiment of the separation section with a cyclone,

FIG. 14B shows a cross-section of the embodiment of FIG. 14A, and

DETAILED DESCRIPTION

Distillation with Vapor Compression (according to the prior art)

Figure 1A:
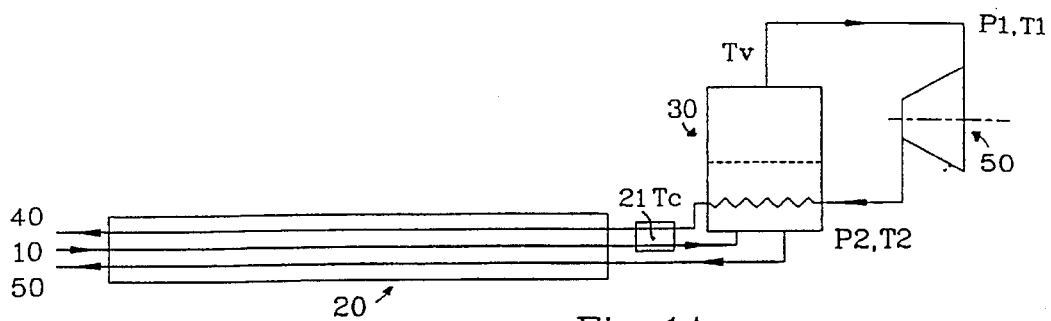
FIG. 1A shows a flow diagram for a conventional distillation apparatus utilizing vapor compression according to the prior art.

FIG. 1A shows a flow diagram of a conventional distillation with vapor compression according to the prior art. A feed stream 10 feeds liquid via a 3-stream heat exchanger 20 and an optional auxiliary heat exchanger 21 to an evaporator condenser 30 where liquid is evaporated, optionally by boiling. The vapor is compressed in a compressor 50 so that the difference between the saturation temperature of the liquid in the compressed and non-compressed vapor is greater than the heat transfer temperature difference between the liquid and the vapor in the evaporator condenser 30.

Figure 1B:
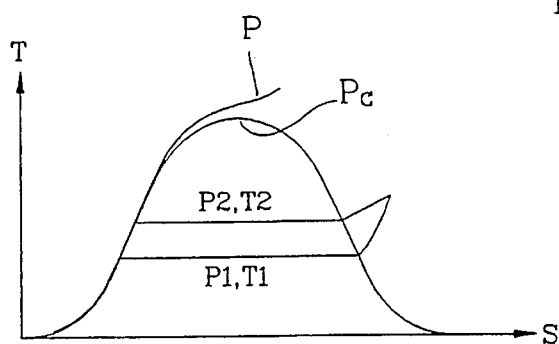
FIG. 1B shows a T,S diagram of the distillation apparatus of FIG. 1A and according to the invention.

FIG. 1B shows a T,S diagram, from which it appears that compression work is to be performed on the vapor from $P_1$ to $P_2$ to raise the temperature from $T_1$ to $T_2$.

Distillation of Liquid with Water Compression (according to the invention)

Figure 2A:
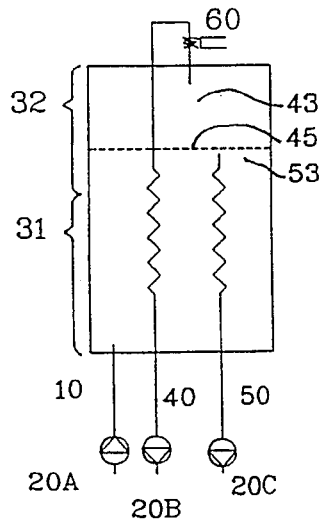
FIG. 2A shows a flow diagram for a distillation apparatus utilizing water compression according to the invention, FIG. 2B Shows a t,h diagram of the water-vapor system at pressures around the critical point.

FIG. 2A shows a flow diagram of distillation with water compression according to the invention. A feed stream 10 is fed via a water pump 20A to a heating zone 31 in which it is heated and from which the heated liquid is fed to a separation zone 32, to which pressure and temperature are applied such that the liquid in the separation zone is in a super critical state, and in which it undergoes a phase shift forming a water vapor phase 43 and liquid residue 53 which are separated by a liquid surface 45 and are discharged via pressure valves 20B and 20C.

Figure 2C:
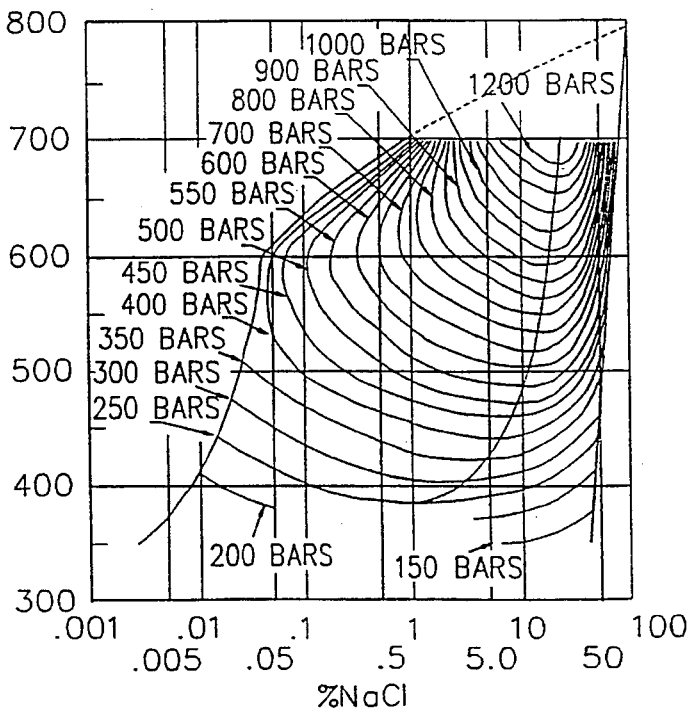
FIG. 2C shows isobar solubility diagrams of NaCl in the water-vapor system around the critical point.
Figure 2B:
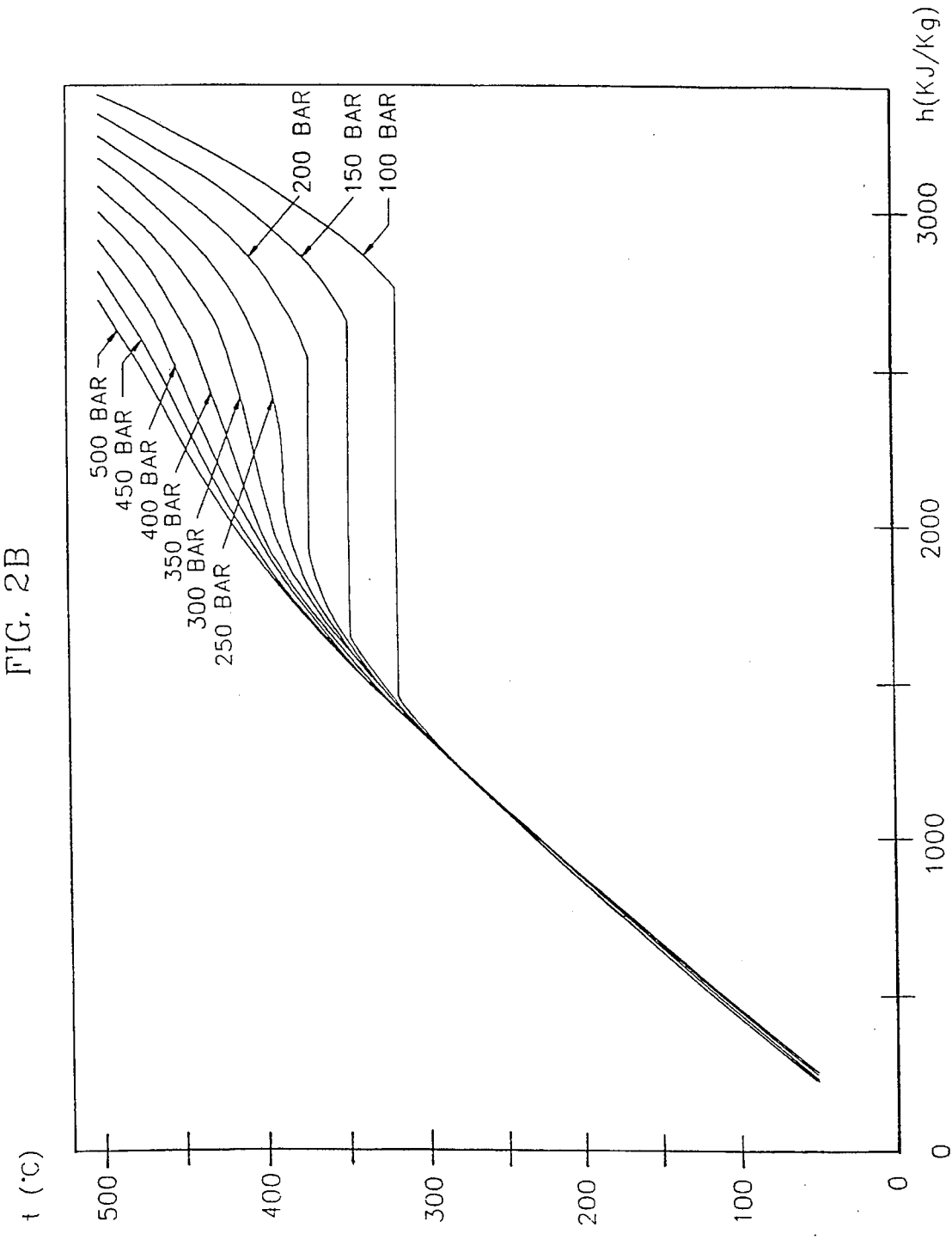

As appears from FIG. 1B and FIG. 2B, at an isobar P above the critical pressure $P_c$ addition of evaporation heat is not required to obtain a phase shift from liquid to vapor, just as the slope of the isobar curve in the T,S diagram under this condition is greater than zero for all values of T and S, so that according to the invention the liquid and the vapor serve as heat sources that do not possess latent evaporation heat.

The curves shown in FIG. 2B appear from Table 3 in "Properties of Water and Steam in SI-Units", Ed. U. Grigull and E. Schmidt, Springer-Verlag, Berlin 1989.

Furthermore, referring to FIG. 2C, it appears from the solubility diagram of NaCl in water, "Natrium, Gmelins Handbuch der Anorganischen Chemie, 8. Auflage, Verlag Chemie, Weinheim 1973, that for a pressure above the critical pressure, e.g. 250 bars, super critical water vapor at a temperature of about 420° C. may be saturated with about 0.05% NaCl and super critical water with about 25% NaCl. Therefore, by applying a pressure and a temperature above the critical point to the separation zone salt water can be separated in a fraction with a low content of NaCl and a fraction with a high content of NaCl. With suitable outlets several fractions of the vapor 33 and the residue 53 may be withdrawn with different NaCl contents.

Figures 3A, 3B, 3C:
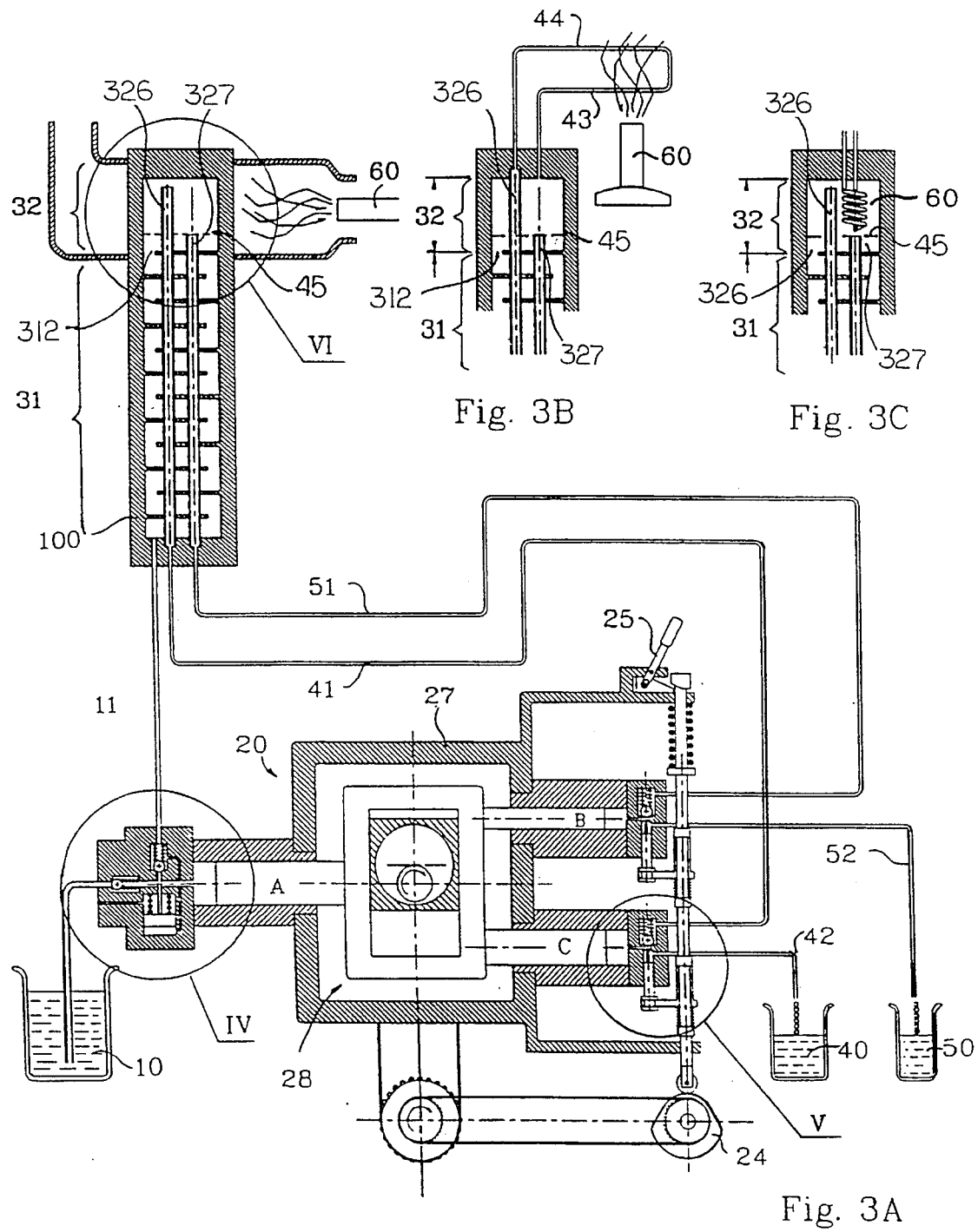
FIG. 3A shows a desalination apparatus according to the invention.
FIG. 3B shows an embodiment of the apparatus of FIG. 3A.
FIG. 3C shows another embodiment of the apparatus of FIG. 3A.
Figure 6:
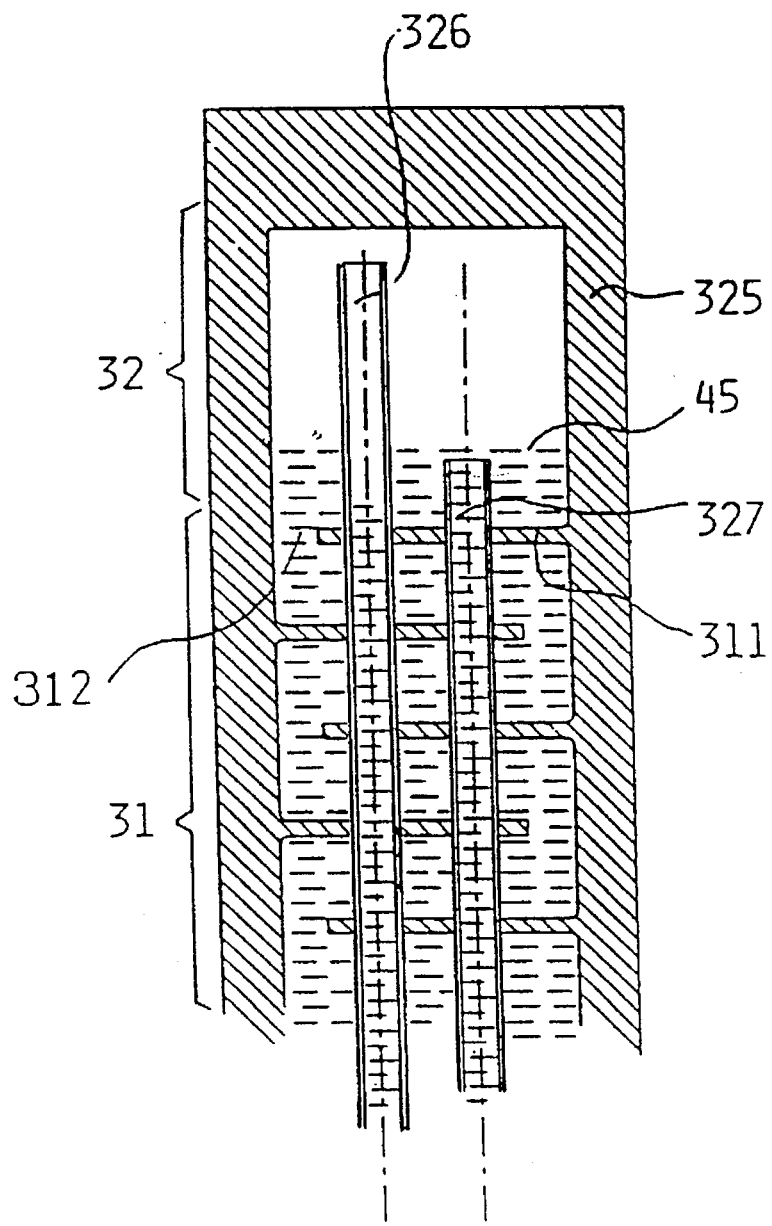
FIG. 6 shows an enlarged section of the separator.

It is shown in FIG. 3A and FIG. 6 how the residue outlet is positioned immediately below the liquid surface.

However, it will be possible to provide more outlets if a residue with a lower concentration of e.g. salt is desired, provided that these outlets are used in connection with withdrawal of the residue immediately below the liquid surface.

Correspondingly, it will be possible to discharge vapor with different contents of e.g. NaCl by mounting the vapor outlet at different distances from the liquid surface or by regulating the temperature of the vapor at the outlet.

FIGS. 3A–C show specific embodiments in which the vapor 43 is discharged with phase shift from vapor to liquid as a distillate 40, the temperature of the vapor in the vapor phase being raised by adding heat to the separation section via a heat source (60) (FIG. 3A), withdrawing the vapor from the separation section 32 and heating it outside by a heat source 60 (FIG. 3B), or introducing a heat source 60 in the separation section 32 (FIG. 3C), the distillate being discharged such as to release its heat to the liquid in the heating section 31.

Correspondingly, the residue 53 is discharged such as to release its heat to the liquid in the heating section 31.

As appears from FIG. 3A, the separation section 32 is part of the heating section 31 so that a pressure equal to the pressure of the separation section is applied to the heating section, but in another specific embodiment (not shown), the separation section 32 is separated from the heating section 31 and connected with suitable feed and discharge means.

The heating section is heated e.g. as shown in a specific embodiment by recovering heat from the vapor 43 and from the residue 53, but the heat for heating the heating section may originate from another heat source or sources. FIGS. 14A,B and 15A,B show preferred embodiments of a predominant part of the separation zone/section 32A which is shaped as a helix, in which the vapor phase 43 and the residue 53 in the individual turns of the helix are separated by a liquid surface because of the centrifugal force.

Figure 15A:
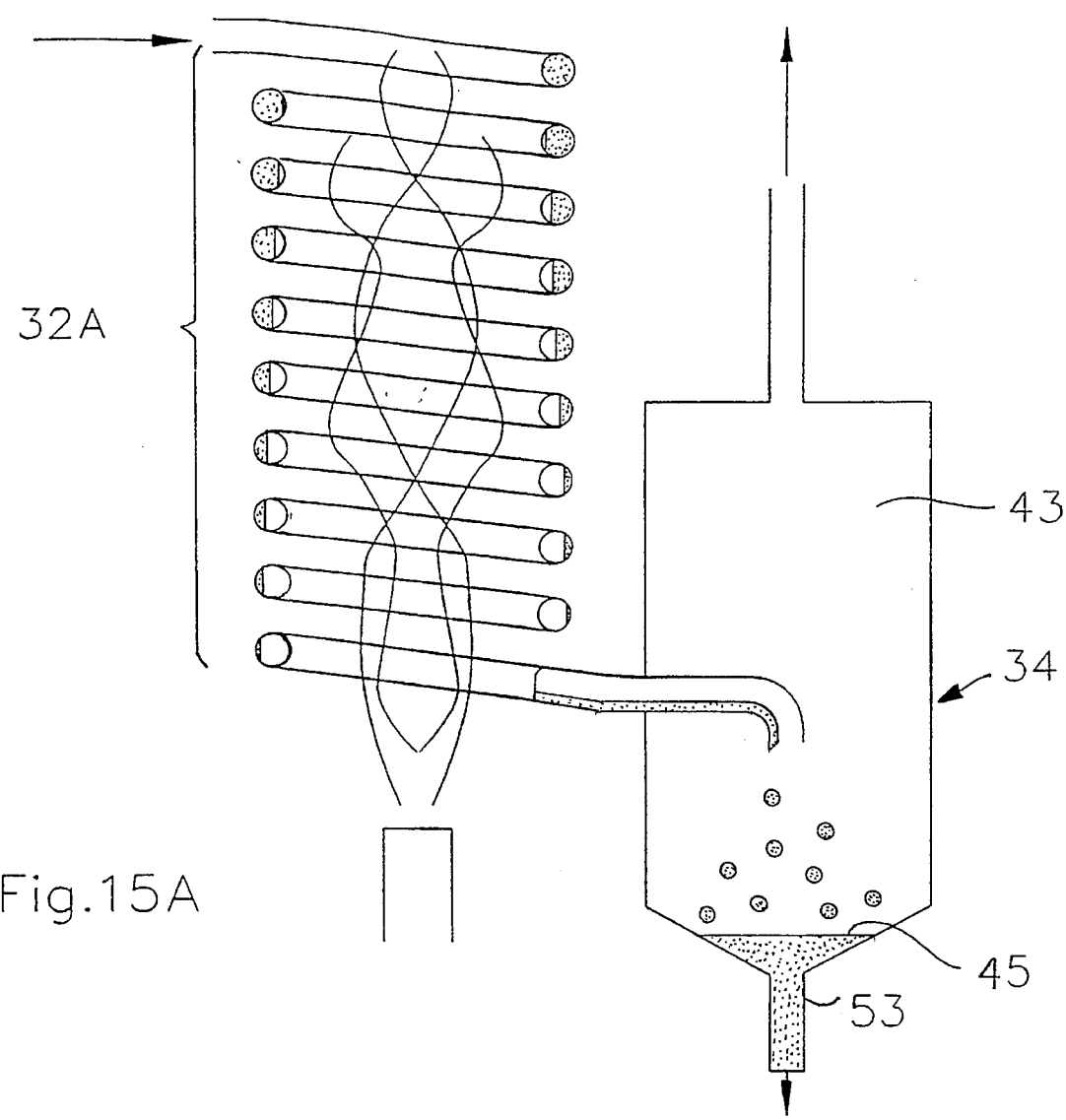
FIG. 15A shows a preferred embodiment of the separation section with a separatory funnel.
Figure 15B:
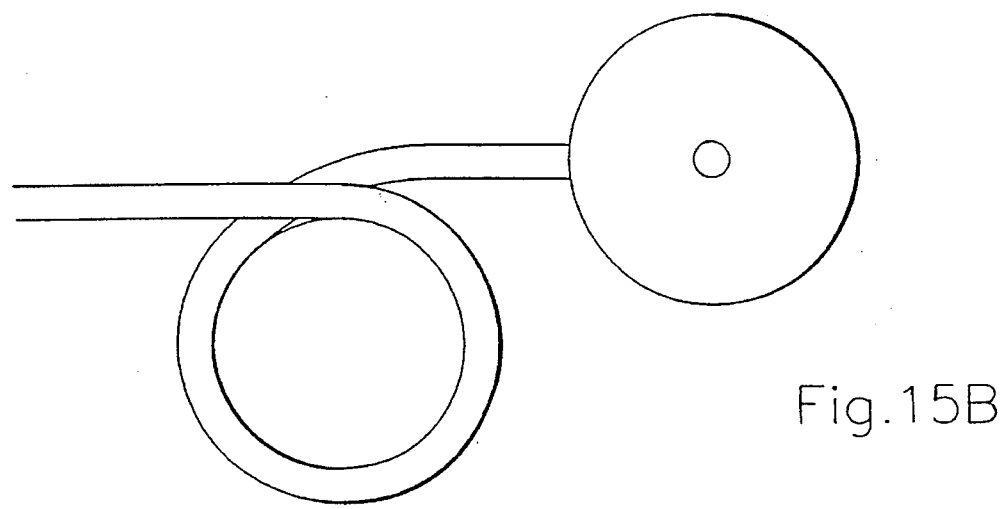
FIG. 15B shows a cross-section of the embodiment of FIG. 15A.

In FIG. 14A, and 14B the last part of the separation section is a cyclone 33, which is a separatory funnel in the embodiment of FIGS. 15A and 15B.

Expedient embodiments of the method and the apparatus appear from the claims, the drawings and the following examples.

EXAMPLES

A plurality of examples of preferred embodiments and use of the invention are given below.

Example 1

Desalination of Salt Water

FIG. 3A shows a preferred embodiment of a desalination apparatus operating according to the method of the invention.

"Separation Section"

FIG. 6 shows an enlarged part of the separation section 32 which consists of a container such as a high pressure chamber 325, in which a vapor pipe terminates in the upper part and a residue pipe 327 in the lower part so that the two pipes terminate on their respective sides of a liquid surface 45 formed at the location where the phase shift for the fed liquid occurs.

In the illustrated embodiment the separation section 32 is incorporated as part of the heating section 31, where the baffle plate 311 for the fed heated liquid and the inlet 312 directly adjoin the separation section 32.

The separation section 32 may be separated from the heating section 31.

"Heating of Vapor in the Separation Section"

FIG. 3 shows a preferred embodiment of the heating of the vapor in the separation section, in which a heating device 60, such as a flame, heats the separation section directly.

FIG. 3B shows another preferred embodiment, where the vapor is withdrawn and then heated by a heating device 60, following which it is recycled to the separation section 32.

FIG. 3C shows yet another embodiment in which a heating device 60, such as a heating member, is introduced in the vapor phase of the separation section above the liquid surface 45.

"Heating Section"

The heating section 31 consists of a device for transferring heat, such as a heat exchanger, arranged as a counter current heat exchanger and constructed to give a mean heat transition number of typically 3 kW/m$^2$ °C.

It is expected that a pure counter current heat exchanger will give a better heat efficiency.

"Water Pump"

The water pump 20 is adapted to feed raw water to the heat exchanger 31 and the separator 32 under a constant water pressure of 240–260 bars, while distillate 40 and residue 50 are withdrawn.

It is preferred that the water pump is adapted such that the energy used for pumping raw water into the heat exchanger and the separator is recovered as much as possible when the water is withdrawn again.

In a preferred embodiment the water pump 20 comprises three cylinders:

a) a cylinder A for pumping raw water 10 into the heat exchanger, b) a cylinder B for removal of concentrated water 50, and c) a cylinder C for withdrawal of distillate 40.

In another preferred embodiment the water pump moreover comprises a cylinder D for driving a piston which is to pulsate the water in the heating and separation section (see example 2).

Figure 4:
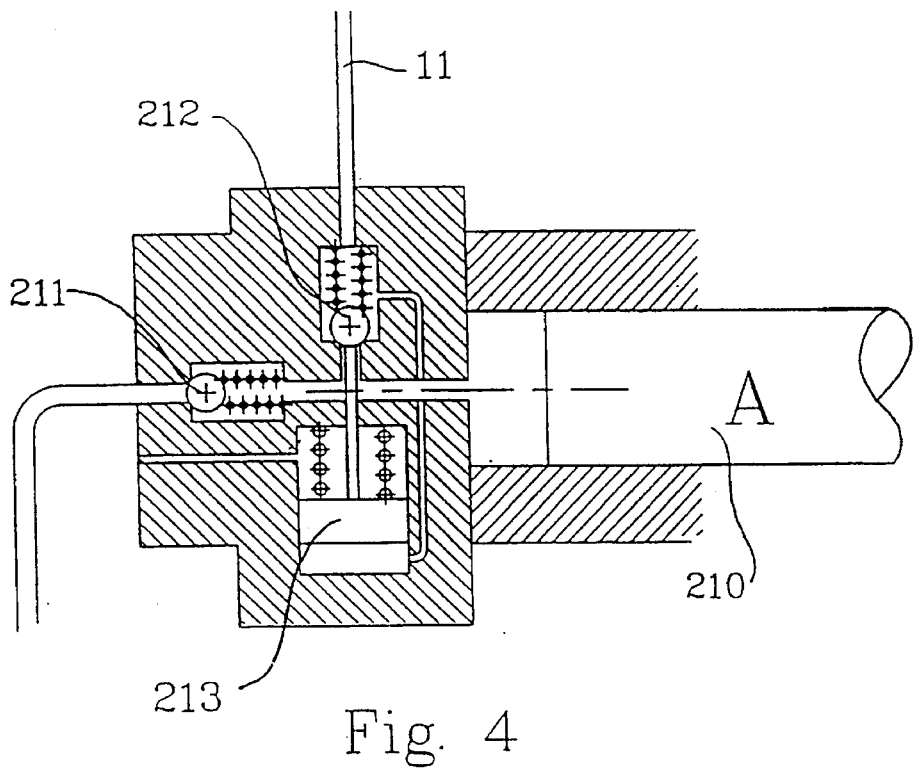
FIG. 4 shows an enlarged section of the pumping device A.

FIG. 4 shows an enlarged section through the raw water pumping cylinder A comprising a piston 210, an inlet valve 211 and an exhaust valve 212, both of which are non-return ball valves.

When the piston 210 moves away from the top position, the inlet valve 211 opens and the exhaust valve 212 closes, so that raw water is drawn in in front of the piston. Conversely, when the piston 220 moves toward the top position, the inlet valve 211 closes and the exhaust valve 212 opens, so that the raw water is discharged into the conduit 11.

The exhaust valve 212 is moreover adapted such that it is prevented from closing when the pressure becomes too big in the system.

Figure 5:
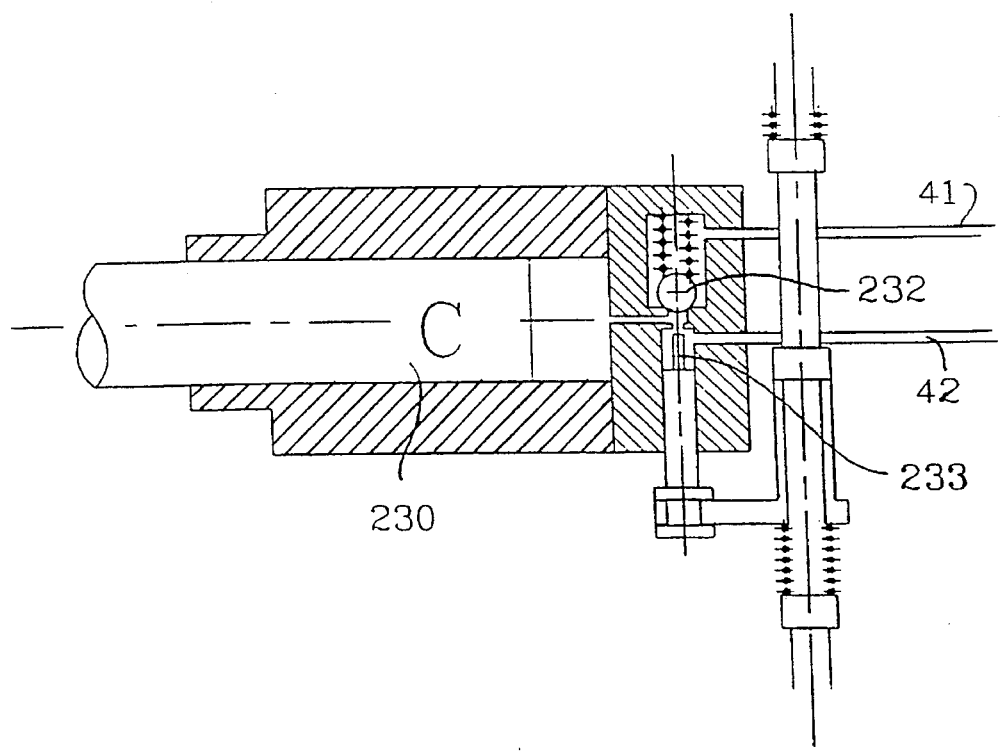
FIG. 5 shows an enlarged section of the withdrawal device C.

FIG. 5 shows an enlarged section through the cylinder C (cylinder B operates in the same manner) comprising a ball valve 232 and a slide valve 233 controlled via a boss 24.

When the piston 230 moves toward the top position, the water is pumped out. Somewhat before the top the discharge of water is shut off by closing the slide valve 233. The water pressure in the cylinder C hereby increases to the same pressure as in the conduit 41. Simultaneously, the slide valve 233 applies a pressure to the ball valve 232 corresponding to the spring pressure with which the balls in the valves are biased.

When the pressure in the cylinder C is approximately the same as in the conduit 41, the slide valve 233 permits inflow of water by lifting the ball from its seat.

When the piston 230 moves toward the bottom position, the ball valve 232 is kept open until the boss 24 pulls back the slides and the ball valve 232 shuts off inflow of water and the slide valve 233 opens for discharge of the water.

This arrangement entails that the ball valve 232 is safeguarded against a great pressure drop across the valve, so that both cavitation and consequent corrosion and great liquid flow surges in the apparatus are avoided.

In a test set up all seals were lip seals, but to reduce the consequent frictional losses it is preferred to use pistons and cylinders without seals and made of a ceramic material or of hard metal.

"Start Procedure"

The apparatus is started by pumping-in distilled water until all system air has been expelled and replaced by water.

Then pumping continues with activated valve lifter 25 so that outflow of water is shut off. The valve lifter 25 is deactivated at the desired pressure, and then the water pump 20 is ready.

The desired pressure is obtained in that the stroke volume of the feed pump, cylinder A in FIG.4, is a few percent greater than the stroke volume of the exhaust pump, cylinders B and C (FIG. 5), so that the pressure in the system assumes a value which is balanced with the spring bias in the feed pump.

Then heat is added in an amount which is regulated until a desired temperature is achieved in the separator, following which the salt water to be distilled is fed.

"Tests"

Tests have been performed in which the pressure in the system has been 250 bars and the temperature profile in the separation zone has been 390°–425° C.

Salt water with 3% NaCl was added, and a distillate with 0.014% NaCl and a residue with 6% NaCl were obtained, which is in good agreement with the solubility diagram in FIG. 2C.

Example 2

Desalination Apparatus with Pulsator

Figure 7:
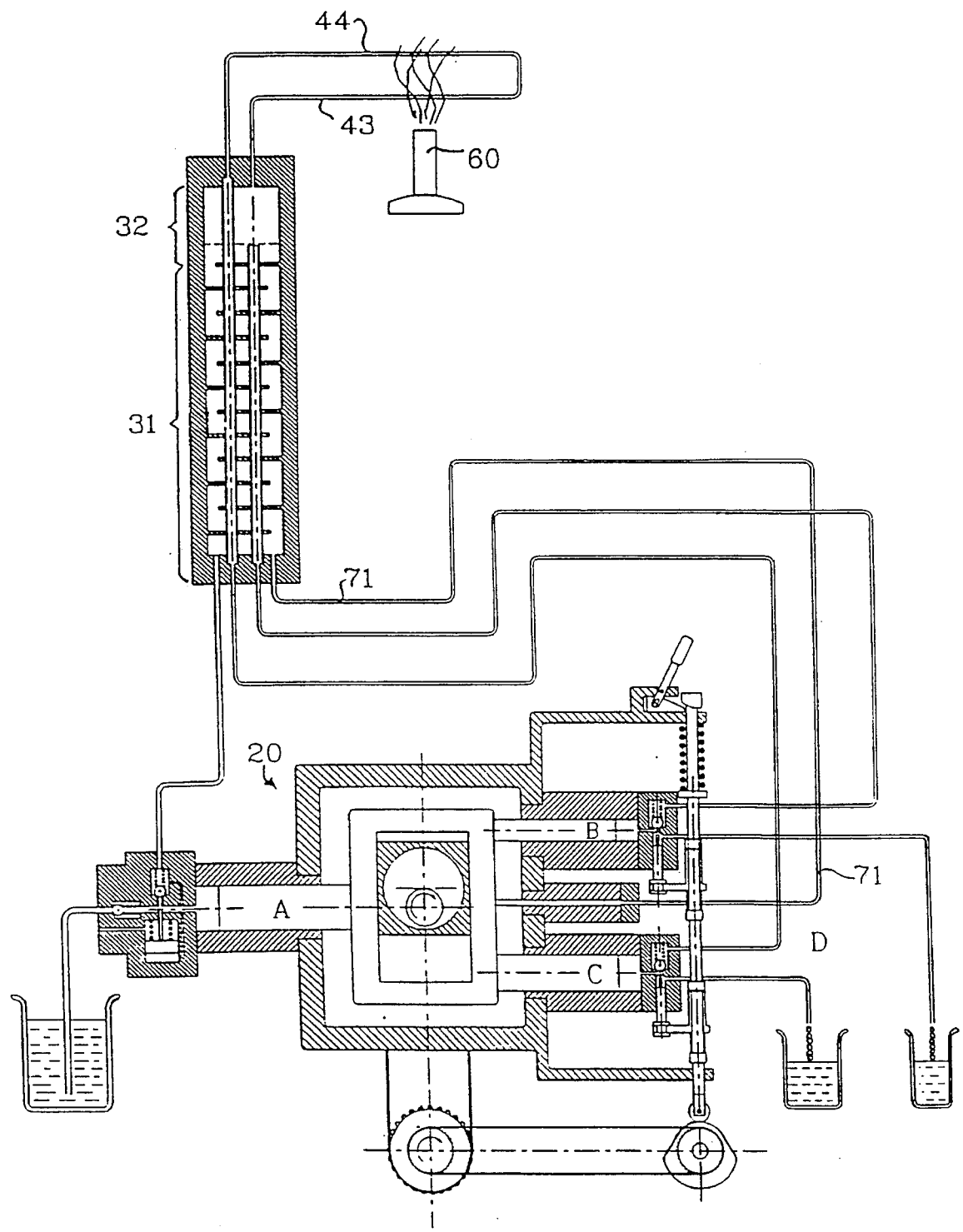
FIG. 7 shows the desalination apparatus of FIG. 3A and FIG. 3B equipped with a pulsator.

FIG. 7 shows an embodiment in which the fed liquid in the heat exchanger is caused to pulsate by means of a fourth cylinder D in the water pump 20 which communicates with the heat exchanger via a conduit 71.

A better separation of the salt in the separator 32 is achieved by pulsating the liquid.

Example 3

Desalination Apparatus with Cyclone

Figure 8:
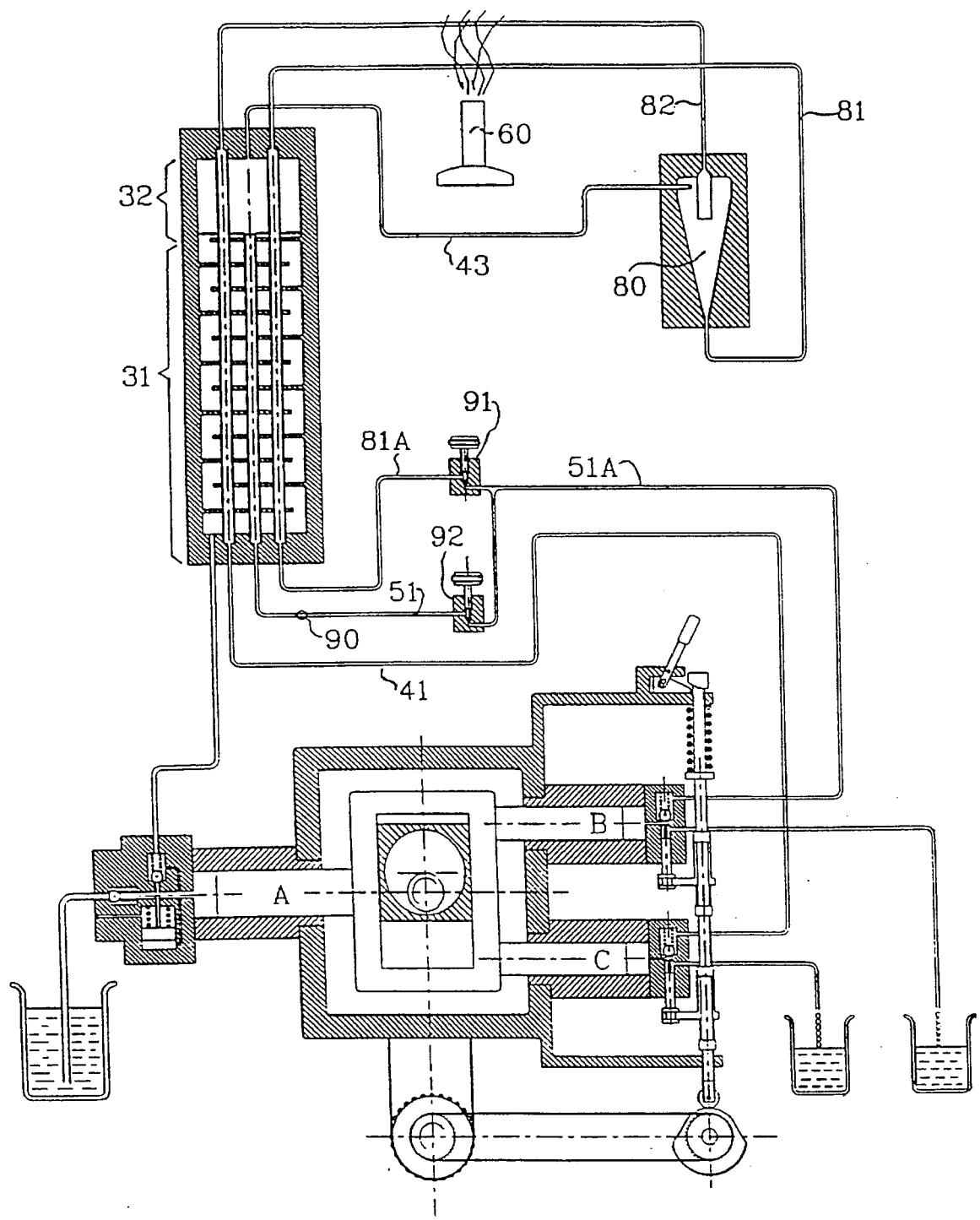
FIG. 8 shows the desalination apparatus of FIG. 3A and FIG. 3B equipped with a cyclone.

FIG. 8 shows an embodiment in which the vapor, which is withdrawn from the separator in the conduit 43, is passed to a cyclone 80, from which super critical vapor both with greater particles and without is passed on for further heating and subsequent condensation in the heat exchanger 31 via the conduit 81 and 82, respectively. Alternatively, heating can take place before the cyclone.

The need for separation of particles, such as salt particles, from the super critical vapor is monitored by measuring the salt concentration in the residue 51 by means of a salt sensor 90, such as a conductivity meter. In case of too great a concentration valve 91 closes slightly and valve 92 opens slightly to reduce the concentration in the residue stream 51, which is passed to the conduit 51A via the valves 91 and 92.

The advantage is that the separator sector can be made smaller and throughput greater.

Example 4

Desalination Apparatus with Filter

Figure 9:
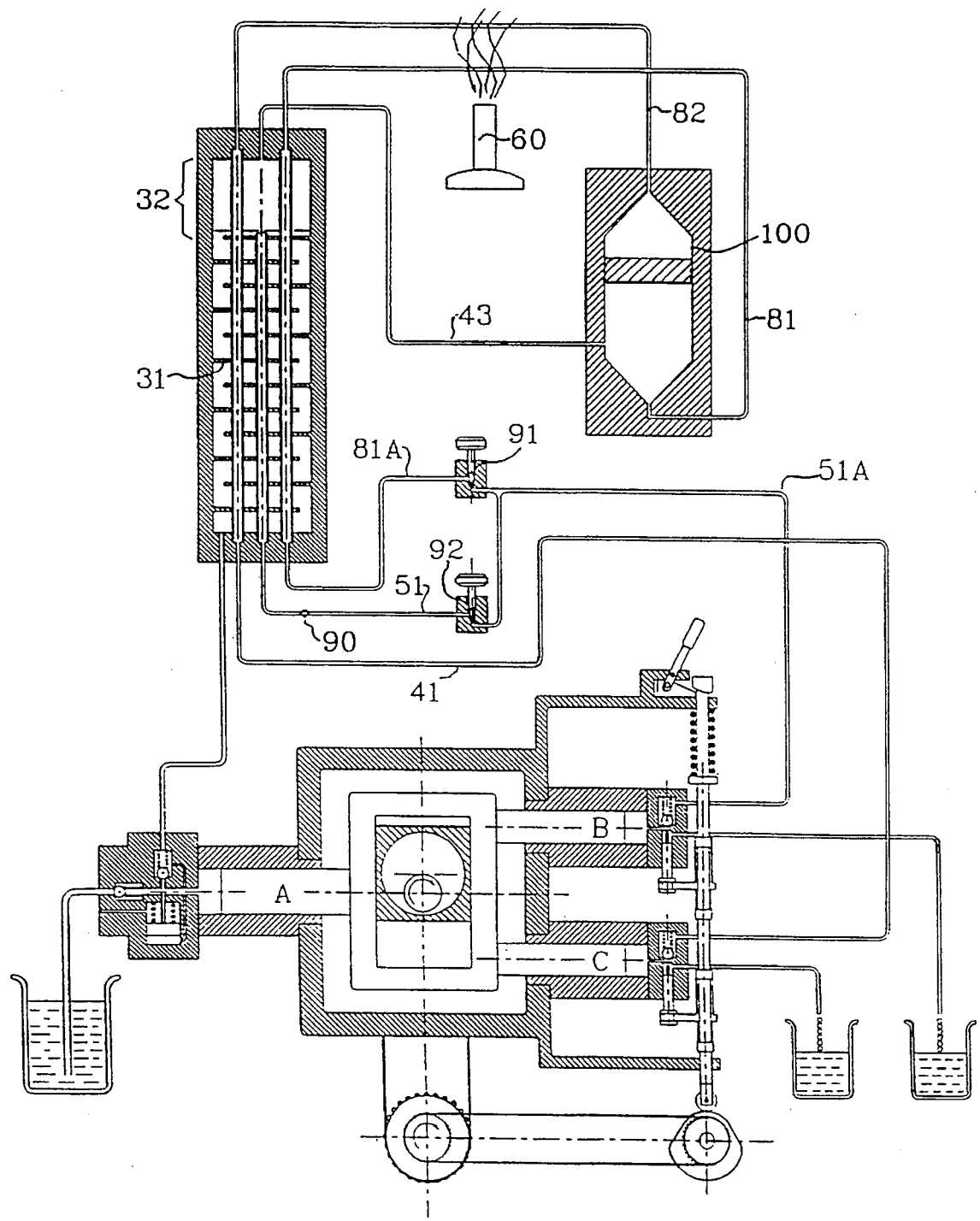
FIG. 9 shows the desalination apparatus of FIG. 8 where the cyclone is replaced by a filter.

FIG. 9 shows an embodiment in which the cyclone 80 in FIG. 8 has been replaced by a filter 100, such as a ceramic filter. Like in the case of the cyclone, the separator can be made smaller and through put greater. Since the filter is moreover cheaper, this embodiment is preferred, in particular in case of smaller devices.

Optionally, an apparatus may comprise both a cyclone and a filter.

Example 5

Desalination Apparatus with a Vapor Compressor

Figure 10:
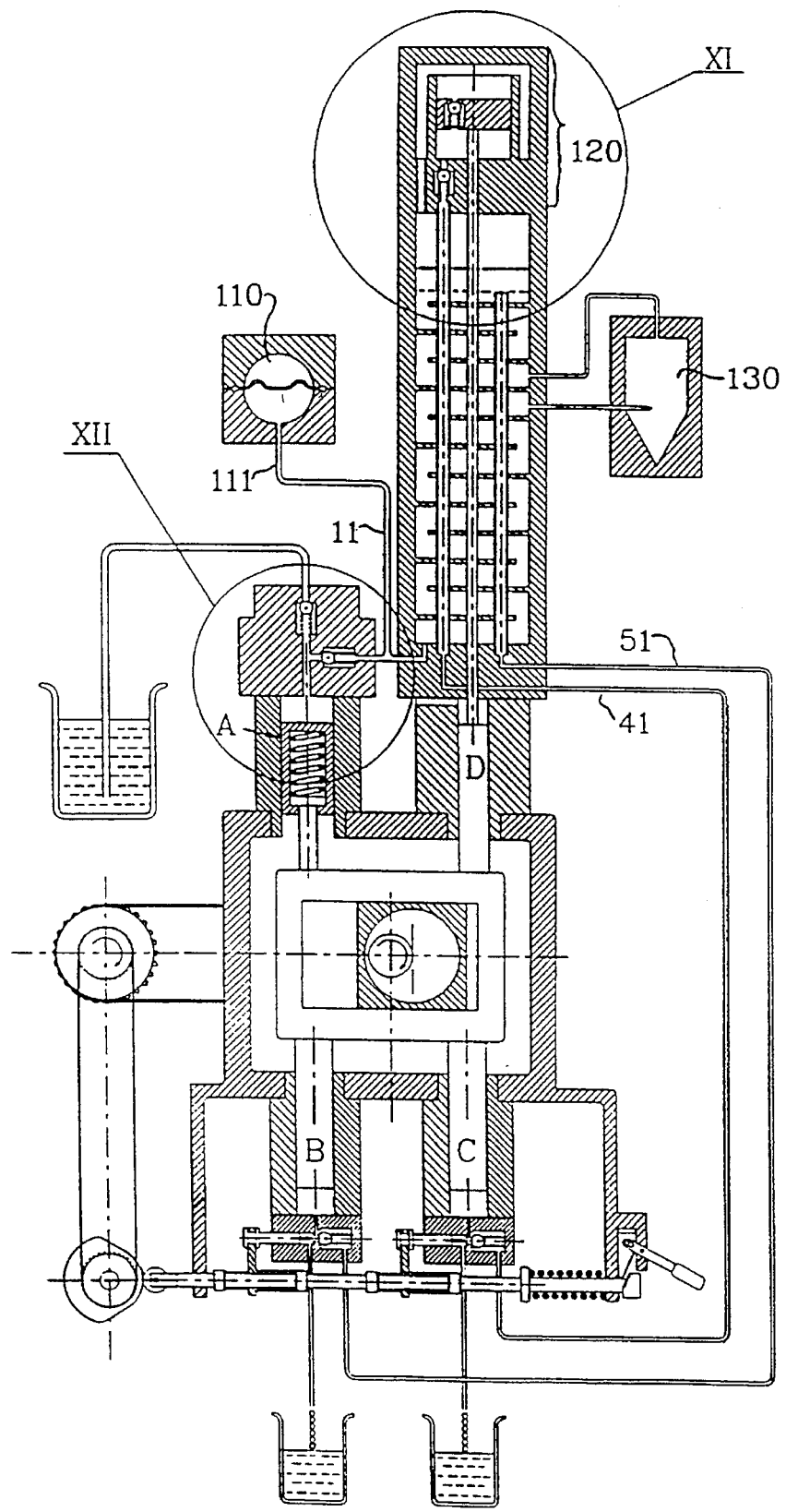
FIG. 10 shows another embodiment of a desalination apparatus provided with a vapor compressor and a sludge trap.

FIG. 10 shows an embodiment in which mechanical vapor compression is performed instead of thermal heating of the formed vapor to increase its temperature.

"Vapor Compressor"

Figure 11:
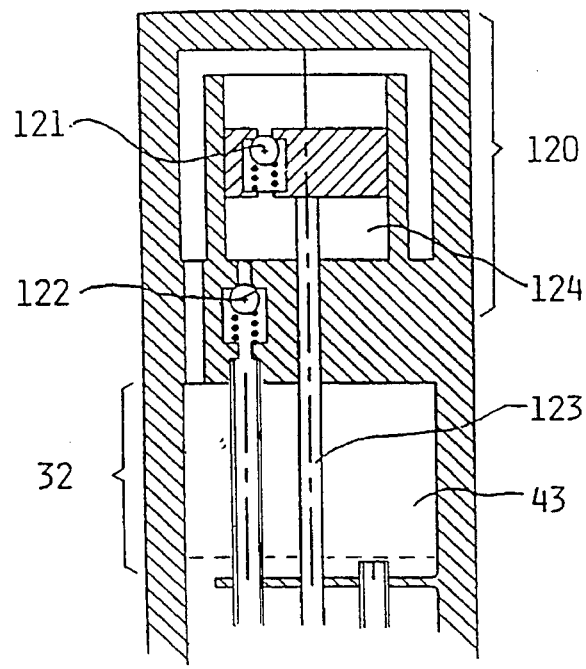
FIG. 11 shows an enlarged section of the vapor compressor of FIG. 10.

FIG. 11 shows an enlarged part of the vapor compressor 120 which must be adapted to work at high temperatures, vapor lubrication and highly oxidative vapor.

Vapour compression is performed in that the piston rod 123, which is operated at room temperature by the cylinder D in the moving system to the water pump 20, is moved such that the non-return ball valve 121 opens and the non-return ball valve 122 closes when the piston rod 123 is urged toward its top position, whereby the volume 124 is filled with vapor 43 from the separation section 32.

Figure 12:
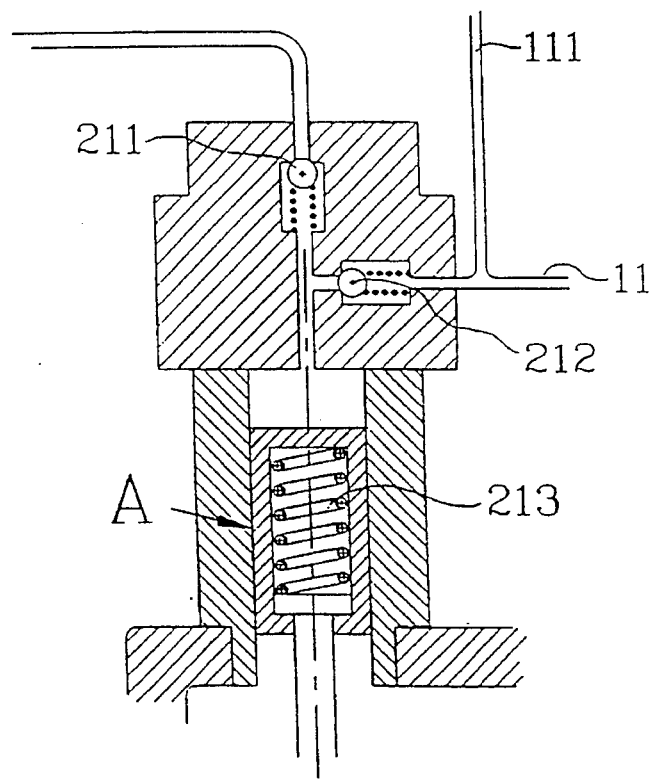
FIG. 12 shows an enlarged section of the pumping device A of FIG. 10.
Figure 13B:
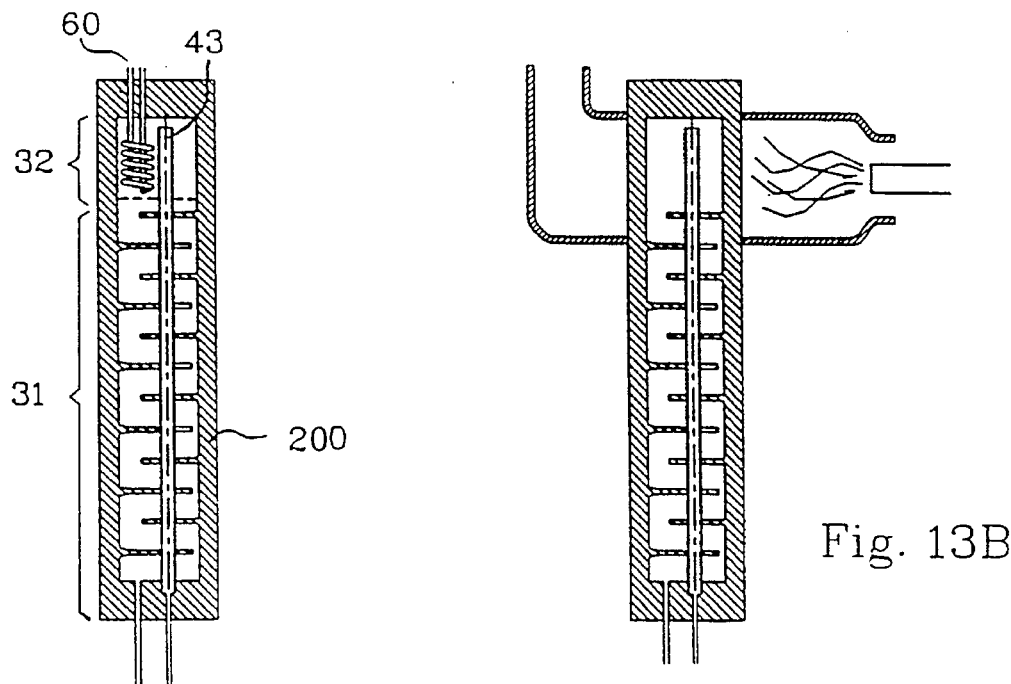
FIG. 13B shows another embodiment of the apparatus of FIG. 13A.
Figure 13A:
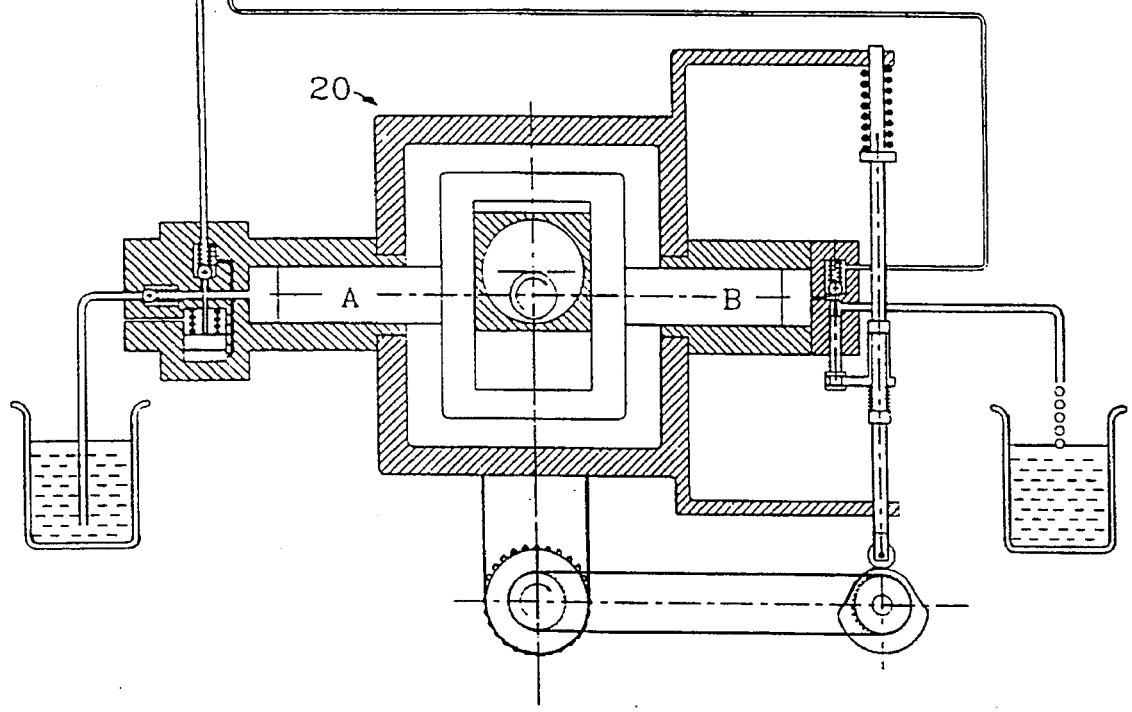
FIG. 13A shows a desalination apparatus in an alternative embodiment to the embodiment shown in FIG. 3A.

FIG. 12 shows an enlarged part of the feed pump comprising two non-return ball valves 211 and 212 as well as a spring-loaded cylinder A, whose spring 213 is adjusted such that the pressure in the system is prevented from exceeding the desired pressure.

The apparatus is moreover provided with an expansion container 110 which, in addition to serving as a pressure valve, also serves as a damper for the pulsation from the vapor compressor 120.

To remove components, such as lime, which are more sparingly soluble than the salt of the main component, the heat exchanger 31 is provided with an outlet for a sludge trap 130 somewhat before the separator 32.

Example 6

Energy Consumption

The energy consumption for 1000 kg of distillate for the desalination apparatus in example 1 was calculated under the following conditions:

| raw water, 3% NaCl: | 1125 kg/h, | temperature 8° C. |
| distillate: | 1000 kg/h, | temperature 15° C. |
| residue, 24% NaCl: | 125 kg/h, | temperature 15° C. | pressure in heat exchanger and separator: 250 bars efficiency of water pump: 85% radiation loss from the apparatus: 10% of added heat a) Power consumption of pump: $0.15 \times 250 \times 10^5 \times 1125/(3600 \times 10^6) = 1.172$ kWh b) Heat consumption 4.184×(15−8)×1.125/3600=9.150 kWh c) Radiation loss: 9.150×0.1=0.915 kWh The total energy consumption depends upon the construction of the pump, heat exchanger and insulation.

Example 7

Energy Consideration for the Apparatus

To evaluate added theoretical heat in the separation zone the following enthalpies were calculated for pure water: Raw water into the heating zone: 1.5 kg, temperature 10° C., pressure 250 bars, 99 kJ;

Distillate at inlet in the top of the separation zone (vapor pipe): 1.0 kg, temperature 420° C., pressure 250 bars, 2774 kJ;

Distillate out of the heating zone: 0.5 kg, temperature 390° C., pressure 250 bars, 107 kJ;

Residue at inlet in the bottom of the separation zone (residue pipe outlet): 0.5 kg, temperature 390° C., pressure 250 bars, 1195 kJ; and Residue out of the heating zone: 0.5 kg, Temperature 20° C., pressure 250 bars, 55 kJ. 162 kJ−99 kJ=63 kJ per 1.0 kg of distillate are added.

Example 8

Comparison of Vapor and Water Compression

To evaluate the size of the mechanical work for a distillation apparatus according to the invention a calculation was made of the compression work for a distillation of raw water at a water production (distillate) of 1 kg/h under the following conditions:

| raw water in: | 1.5 kg/h, | temperature 10° C. |
| distillate out: | 1.0 kg/h, | temperature 20° C. |
| residue out: | 0.5 kg/h, | temperature 20° C. | a) Heat loss of outgoing water (common to vapor and water compression):
$Q=dt \times C_p \times m/3600=17.43$ Wh
$C_p=4184$ J/kg at 250 bars.

b) Vapor Compression Work:

| pressure in evaporator: | 1 bar, | temperature 100° C. |
| pressure in condensator: | 1.5 bars, | temperature 110° C. |

Theoretical work:

$$L=k/(k-1) \times P_1 \times V_1((P_2/P_1)^{((k-1)/k)}-1)/3600=19.86 \text{ Wh}$$

Expected Work: 19.86 / 0.5=39.7 Wh.

c) Water Compression Work
Pressure in heat exchanger and separator: 250 bars
Theoretical work:

$$L=P \times V/3600=10.42 \text{ Wh},$$

which gives L=5.21Wh with a recovery degree of 50%.

For a continuous water production of 1 kg/h there is a saving in work of about 5 times by water compression with respect to vapor compression, which enables distillation of a liquid with a lower energy consumption than in the heretofore known methods, and the distillate is always sterile.

I claim:

1. An apparatus for distillation of a purifiable liquid near or above its critical point, wherein the purifiable liquid contains a dissolved solid, said apparatus comprising:

separation means for separating the liquid into a vapor phase in a supercritical state and a liquid residue separated by a liquid surface within a separation vessel;

heat exchange means, including a heat exchanger operably connected to the separation means, for transferring heat from the vapor phase and the liquid residue to the liquid within the separation vessel;

means for pumping the liquid into said heat exchanger and for feeding the liquid into said separation means for separating the liquid into the vapor phase and the liquid residue separated by the liquid surface; said separation vessel having a liquid inlet, a vapor outlet, and a residue outlet; said vapor outlet being positioned at the top of the separation vessel; said liquid inlet being positioned at the bottom of the separation vessel; said liquid residue outlet being positioned in the separation vessel between the liquid inlet and the vapor outlet and immediately below the surface of the liquid to maximize the concentration of the dissolved solid discharged through the liquid residue outlet;

means for establishing a pressure and a temperature in the separation means sufficient to bring the liquid to a state near or above the critical point so as to form the vapor phase and the liquid residue, and for establishing a temperature profile in the purifiable liquid which increases from the liquid at the liquid inlet to the vapor phase at the vapor outlet;

first means for discharge of the liquid residue and second means for discharge of a distillate.

2. An apparatus according to claim 1, wherein said means for pumping the liquid comprises reciprocating pumps with displacement means for pumping the liquid into the heat at exchanger, with said first means for discharge of the liquid residue and with said second means for discharge of distillate, wherein each of said first and second means has a pumping-out cylinder associated therewith, and wherein each of the pumping-out cylinders associated with said first means and said second means communicates with an outlet valve and a slide valve controlled by piston means for providing movement of a piston such that the slide valve shuts off outflow of liquid to a discharge outlet when the piston reaches a first position, and opens the outlet valve when pressures above the outlet valve permit.

3. An apparatus according to claim 2, wherein the piston means further controls the piston movement so that the slide valve shuts off inflow of liquid from the outlet valve when the piston has reached a second position, and opens for outflow of liquid to the discharge outlet when pressures above the outlet valve permit.

4. An apparatus according to claim 2, wherein the apparatus further comprises a pumping-in cylinder associated with the displacement means communicating with an exhaust valve which is connected with a relief valve adjusted to open when the pressure in the apparatus exceeds a desired pressure.

5. An apparatus according to claim 1 wherein the means for establishing a pressure and a temperature in the separation means comprises a heat source which adds heat to the separation means inside said separation means.

6. An apparatus according to claim 1 wherein the means for establishing a pressure and a temperature in the separation means comprises a heat source which adds heat to the separation means both outside and inside said separation means.

7. An apparatus according to claim 1 wherein the vapor outlet includes a section outside the separation means which is heated by a heat source.

8. An apparatus according to claim 1 wherein the separation means comprises a cyclone.

9. An apparatus according to claim 1 wherein the separation means comprises a separatory funnel.

10. An apparatus according to claim 1 wherein the means for establishing a pressure and a temperature in the separation means comprises a heat source radially positioned within a spiral shaped course of a part of the separation means.

11. An apparatus as claimed in claim 1 wherein the vapor phase comprises about 0.05% or less of the dissolved solid.

12. An apparatus as claimed in claim 11 wherein the liquid is water and the dissolved solid is salt.

* * * * *